Figure 6:
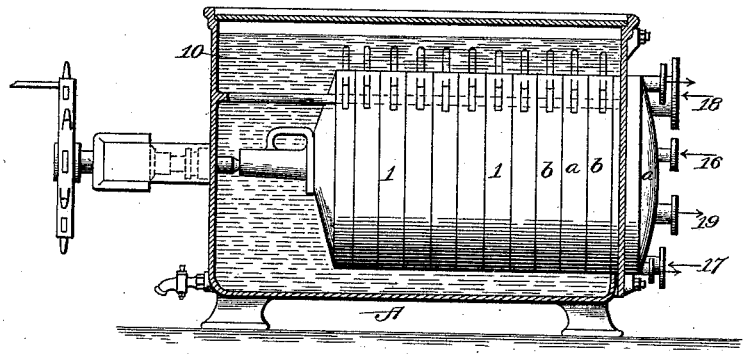

(No Model.) 2 Sheets—Sheet 1.
J. KLEIN.
HEATING AND COOLING LIQUIDS.
No. 430,961. Patented June 24, 1890.
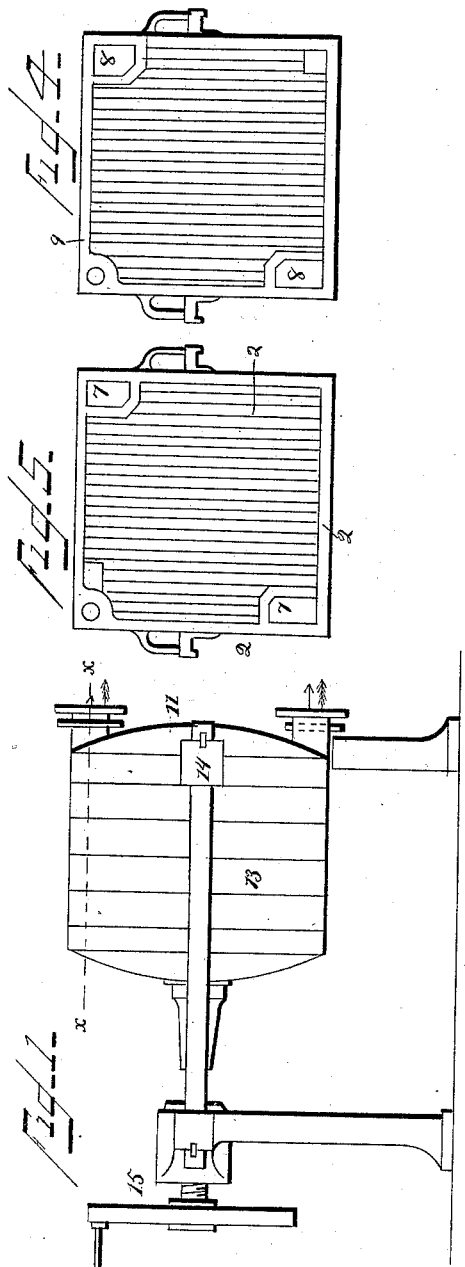
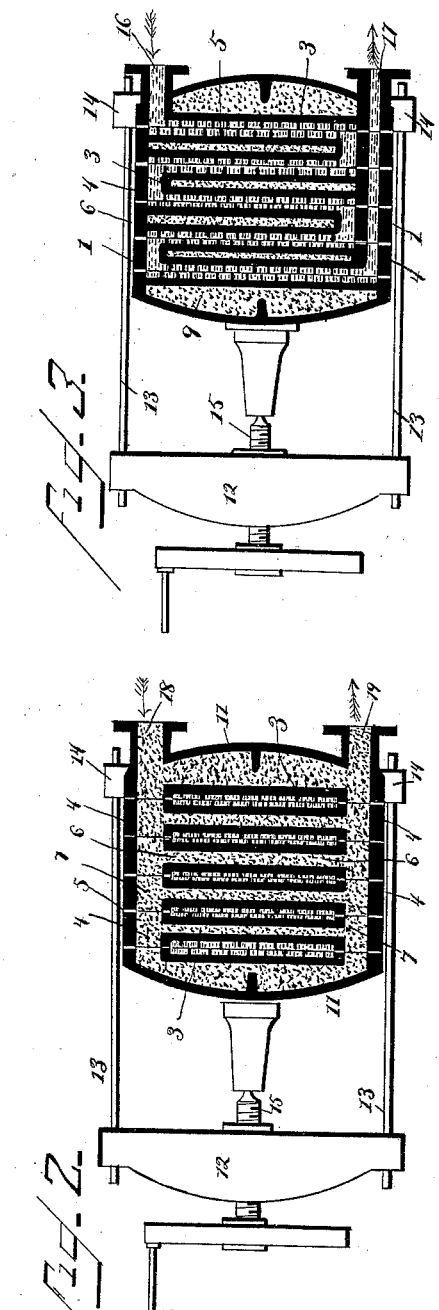
WITNESSES:
F. L. Durand
W. L. Coombs
INVENTOR:
Johann Klein
By Louis Bagger & Co.
Attorneys (No Model.) 2 Sheets—Sheet 2.

J. KLEIN.
HEATING AND COOLING LIQUIDS.

No. 430,961. Patented June 24, 1890.

WITNESSES:
F. L. Ourand
Jo. L. Coombs

INVENTOR
Johann Klein
By Sous Taggart
Attorneys

UNITED STATES PATENT OFFICE.

JOHANN KLEIN, OF FRANKENTHAL, BAVARIA, GERMANY.

HEATING AND COOLING LIQUIDS.

SPECIFICATION forming part of Letters Patent No. 430,961, dated June 24, 1890.

Application filed October 15, 1889. Serial No. 327,083. (No model.)

*To all whom it may concern:*

Be it known that I, JOHANN KLEIN, a subject of the King of Bavaria, and a resident of the city of Frankenthal, in the Kingdom of Bavaria, German Empire, have invented certain new and useful Improvements in Heating and Cooling Liquids or Gases; and I do hereby declare that the following is a full, clear, and exact description of the invention, which will enable others skilled in the art to which it appertains to make and use the same.

My invention relates to certain improvements in apparatus for heating and cooling liquids or gases, its object being to provide such an apparatus in which the liquids or gases can be economically warmed or cooled in a rapid and effective manner with but a comparatively small expenditure of heating or cooling agents.

The invention consists in the novel features of construction and combination of parts hereinafter fully described, and then pointed out in the claim.

In the accompanying drawings, Figure 1 is a side elevation of an apparatus constructed in accordance with my invention. Fig. 2 is a horizontal section of the same on line $x\ x$, Fig. 1. Fig. 3 is a transverse section through the apparatus. Figs. 4 and 5 are plan views of two of the sections, which, when placed together, form the chambers, respectively, for the heating or cooling medium and the substance to be acted upon. Fig. 6 shows the apparatus mounted in a water basin or reservoir, which is employed when the apparatus is used for condensing gases.

In the said drawings, the reference-numeral 1 designates the sections, which, when placed together, form the chambers, respectively, for the passage of the substance to be warmed or cooled and for the heating or cooling medium. These sections are square or rectangular in form, and each consists of the four outer walls 2 and the interior walls or partitions 3, the outer walls 2 being extended laterally beyond the partitions 3, as seen at 4, so that when placed or fitted together the spaces 5 between the sections form the chambers for the liquids or gases to be warmed or cooled. The spaces 6 between the partitions 3 form the chambers for the heating or cooling agent or medium. These sections or plates are provided at opposite diagonal corners with openings 7 7, which communicate with the spaces 6, and thus form with said spaces a continuous chamber for the passage of the heating or cooling agent, such agent—steam or water—being admitted at one opening 7, and escaping at the other after having circulated throughout said chamber. At the opposite corners the sections are provided with openings 8 8, communicating with the spaces 5, so that said spaces form a series of connected chambers for the passage of the liquid or gas to be heated or cooled. The partitions 3 on their outer sides are provided with vertical ribs 9 for the purpose of enlarging the radiating-surfaces of the sections.

In putting the apparatus together the sections are placed face to face with the outer portions 4 of the walls in contact with each other, thus forming the chambers 5 and 6, connected together, respectively, by the openings 8 and 7.

In Fig. 6 I have shown the apparatus as inclosed within a water reservoir or basin 10. This reservoir is to be filled with water, and is used when the apparatus is employed for cooling gas for the purpose of cooling the outer walls of the apparatus, and thus aiding in the work of condensation. It will be seen that the end sections have each only one partition 3, and are provided with end walls 11. 12 designates a cross-head, through which pass the bars 13, secured to the lugs 14 on one of the end sections. 15 is a screw passing through the cross-head and bearing upon the opposite section. The operation of this screw is obvious, its object being to hold the sections securely together.

The operation of the apparatus is as follows: The liquid or gas to be heated or cooled is passed into the chambers 5 through the openings 8 8, entering at 16 and finding their exit at 17, after having circulated through said chambers. Steam or cold water, as the case may be, is at the same time forced through the chambers 6, entering at 18 and traversing said chamber to the exit 19, the liquid or gas in chambers 5 being thus thoroughly warmed or cooled.

It will be noted that the operation is continuous, thus allowing the necessary elevation or reduction of temperature to be accomplished in a rapid and economical manner.

Having thus described my invention, what I claim is—

In an apparatus for heating or cooling liquids or gases, the combination, with the sections 1, consisting of the walls 2 and partitions 3 and having the openings 7 and 8, of the cross-head 12, bars 13, secured to lugs 14 on one of the sections 1, and the screw 15, passing through the cross-head, substantially as described.

In testimony that I claim the foregoing as my own I have hereunto affixed my signature in presence of two witnesses.

JOHANN KLEIN.

Witnesses:
  AUGUST STAHL,
  B. ROI.